United States Patent [19]
Harris et al.

[11] 3,885,022
[45] May 20, 1975

[54] METHOD OF PRODUCING BORON CARBIDE FROM WATER-ALCOHOL SOLUTION OF CARBON SOURCE

[75] Inventors: Geoffrey Lyall Harris, Monroeton; Donald S. Parsons, Towanda, both of Pa.

[73] Assignee: GTE Sylvania Incorporated, Stamford, Conn.

[22] Filed: Jan. 10, 1974

[21] Appl. No.: 432,345

[52] U.S. Cl. .................. 423/291; 106/43; 423/439
[51] Int. Cl. ............................................ C01b 31/30
[58] Field of Search ....... 423/291, 439, 345; 106/43

[56] References Cited
UNITED STATES PATENTS

| | | | |
|---|---|---|---|
| 3,085,863 | 4/1963 | Prener | 423/345 |
| 3,379,647 | 4/1968 | Smudski | 423/291 |

*Primary Examiner*—Walter R. Satterfield
*Attorney, Agent, or Firm*—Norman J. O'Malley; Donald R. Castle; John C. Fox

[57] ABSTRACT

A process wherein a boron source selected from boric acid or boric oxide, a carbon source and a short chain polyhydric alcohol selected from the group consisting of glycerol, ethylene glycol and diethylene glycol are mixed together to form a solution which is thereafter evaporated and the resultant solids are heated to form boron carbide is improved by utilizing a controlled amount of water in the original solution, drying the solution in air having a temperature relatively close to the boiling point of the alcohol, thereafter heating the dried material in a hydrogen atmosphere at a temperature of about 700°C to form a granular product and thereafter firing the granular product at a temperature of at least about 1700°C in an inert gas atmosphere to form a free flowing boron carbide powder.

10 Claims, No Drawings

METHOD OF PRODUCING BORON CARBIDE FROM WATER-ALCOHOL SOLUTION OF CARBON SOURCE

BACKGROUND OF THE INVENTION

1. Field of the Invention

This invention relates to the production of boron carbide. More particularly, it relates to an improved process for the production of boron carbide.

2. Prior Art

Several methods are disclosed in the art for making carbides. These are detailed in U.S. Pat. No. 3,379,647. In that patent, however, a method of preparing boron carbide is disclosed in which stoichiometric amounts of boric acid and a carbon source (generally sucrose) are dissolved in an appropriate solvent to form a solution which after evaporation the resulting solids are heated at a temperature of about 1800° C to about 2000° C to yield boron carbide. That process, while it yields a free flowing boron carbide powder, has some drawbacks. For example, there is a large amount of smoke, vapors and particulate material given off which can plug the furnace and drier vents. A practical manufacturing system necessitates a large amount of equipment for the removal of smoke, vapors and particulate material, It is believed, therefore, that a process which does not yield a large amount of smoke, fumes or particulate material hence would not tend to plug the vents of driers or furnaces would be a significant advancement in the art.

OBJECTS AND SUMMARY OF THE INVENTION

It is an object of this invention to provide an improved process for the production of boron carbide.

It is an additional object of this invention to provide a process for the production of boron carbide which is relatively free of smoke and fumes.

These and other objects are achieved in one aspect of the invention wherein boron oxide and boric acid and carbon source are dissolved in water and an alcohol such as glycerol, diethylene glycol or ethylene glycol which solution is thereafter dried to form a solid material substantially free of the solvent. The resulting solid material is thereafter heated in a hydrogen atmosphere at about 700° C to form a granular product. The granular product is then fired in an inert atmosphere at a temperature of from at least about 1700° C to about 1800° C to form a free-flowing boron carbide powder.

DETAILS OF THE PREFERRED EMBODIMENTS

For a better understanding of the present invention, together with other and further objects, advantages and capabilities thereof, reference is made to the following disclosure and appended claims in connection with the above description of some of the aspects of the invention.

The essential raw materials of the present invention are a boron source, a carbon source, a particular alcohol and water in controlled ratios. The boron source is selected from the group consisting of boric acid and boron oxide. The carbon source is generally a hydrocarbon which under heat will decompose to form elemental carbon and water. Sugars such as sucrose, glucose and the like are generally desired because they are in plentiful supply, relatively cheap and are pure thus do not contain contaminants which could lower the quality of the boron carbide. The alcohols which are employed are relatively short chain polyhydric alcohols selected from the group consisting of glycerol, ethylene glycol and diethylene glycol. These materials are water-soluble, act as solvents for the boron source and are compatible with the carbon source. The resulting solution in controlled ratios is thereafter dried at temperatures approaching the boiling point of the particular alcohol which is used. Atmospheric air heated to the appropriate temperature generally about 170° to 190° C is a satisfactory method of removing the water and the solvent. Thereafter the material formed is relatively easily broken up and can thereafter be processed as disclosed in detail hereinafter. The resulting material is heated in a hydrogen atmosphere at about 700° C to form a granular mass. The granular material is then heated at about 1700° C to about 1800° C in an inert gas atmosphere (generally argon) and a free flowing boron carbide powder is produced. There is no smoke, fumes or particulate material given off. Thus, a higher raw material efficiency is achieved than with prior art processes. The problems with the plugging of vents from condensed smoke and vapors and particulate matter is virtually eliminated by the improvement disclosed herein.

A stoichiometric excess of the carbon source is utilized. Generally, at least 50% excess of the amount of carbon theoretically required to convert all of the boron to boron carbide is used.

The amount of alcohol used can be varied, however, sufficient alcohol is required to dissolve all of the boron. Generally about one-third the weight of the boron source provides sufficient solvent capability. Large amounts can be used, however, since they have to be removed in the drying system it is preferred to use as small amount as is possible to dissolve all of the boron source.

While the water to the dihydric or trihydric alcohol weight ratio can vary such as from about 1:1.5 to 1:2.5 parts of water per part of alcohol and some of the benefits of the invention be achieved, the preferred weight ratio of alcohol to water is 2:1. The resulting material is dried in air at about 180° C ± 10° C. The preliminary firing step at 700° C under hydrogen is an essential step to achieve a material which is free flowing after light comminution. Higher or lower temperatures than 700° C are not as beneficial and can have some adverse effects although a variation of about ± 10° can be tolerated. The firing temperature is generally at 1700° C, although temperatures as high as 1800° C can be used. To more fully illustrate the subject invention, the following detailed examples are presented. All parts, proportions are by weight unless otherwise specified.

EXAMPLE I

About 605 parts of boric acid, about 285 parts of sugar are dissolved in about 200 parts of ethylene glycol and about 100 parts of water. The solution is thereafter dried with air at about 180° C in an atmospheric dryer. The resulting cake is friable and breaks into pieces small enough to pass through the openings in a screen having openings of about 0.25 inches in diameter. The resulting dried material is thereafter heated in hydrogen at a temperature about 700° C. The time will vary, but in general the hydrogen is given off upon heating and burns with a blue-green flame indicating trace boron being evolved during the reaction. After the material is heated until there is no longer any boron evolved and flame color lost, it is reduced to a coarse granular powder and fired at about 1700° C for about 7 hours to a fine powder. The material is identified by x-ray as being boron carbide.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein a boron source selected from the group consisting of boric acid and boron oxide, a hydrocarbon carbon source which under heat will decompose to form elemental carbon and water and a polyhydric alcohol selected from the group consisting of glycerol, ethylene glycol and diethylene glycol are mixed together to form a solution which is heated to form boron carbide, the improvement comprising
    a. adding a controlled amount of water to said solution of said boron source, said hydrocarbon carbon source and polyhydric alcohol,
    b. drying said solution in air at a temperature relatively close to the boiling point of the alcohol,
    c. heating the dried material in a hydrogen atmosphere at a temperature of from about 690° C to about 710° C to form a granular product, and
    d. firing said granular product at a temperature of at least about 1700° C in an inert gas atmosphere to form a free flowing boron carbide powder.

2. An improvement according to claim 1 wherein said heating step is about 700° C.

3. An improvement according to claim 1 wherein the weight ratio of water to alcohol is from about 1:1.5 to about 1:2.5.

4. An improvement according to claim 3 wherein the water to alcohol weight ratio is about 1:2.

5. An improvement according to claim 4 wherein said boron source is boric acid, said carbon source is sucrose and said alcohol is ethylene glycol.

6. An improvement according to claim 5 wherein said drying temperature is about 170° C to about 190° C.

7. An improvement according to claim 6 wherein said heating temperature is about 700° C.

8. An improvement according to claim 7 wherein said firing temperature is from about 1700° C to about 1800° C.

9. An improvement according to claim 8 wherein said firing temperature is about 1700° C.

10. An improvement according to claim 9 wherein said inert atmosphere is argon.

* * * * *